United States Patent
Rao

(10) Patent No.: US 12,478,873 B2
(45) Date of Patent: Nov. 25, 2025

(54) VIRTUAL ITEM PROCESSING METHOD AND DEVICE

(71) Applicant: NETEASE (HANGZHOU) NETWORK CO., LTD., Zhejiang (CN)

(72) Inventor: Feng Rao, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 314 days.

(21) Appl. No.: 18/245,723

(22) PCT Filed: Feb. 22, 2021

(86) PCT No.: PCT/CN2021/077314
§ 371 (c)(1),
(2) Date: Mar. 17, 2023

(87) PCT Pub. No.: WO2022/057201
PCT Pub. Date: Mar. 24, 2022

(65) Prior Publication Data
US 2023/0356079 A1    Nov. 9, 2023

(30) Foreign Application Priority Data

Sep. 17, 2020   (CN) .......................... 202010983011.1

(51) Int. Cl.
*A63F 13/52* (2014.01)
*A63F 13/2145* (2014.01)
*G06F 3/0488* (2022.01)

(52) U.S. Cl.
CPC .......... *A63F 13/52* (2014.09); *A63F 13/2145* (2014.09); *G06F 3/0488* (2013.01); *A63F 2300/1075* (2013.01); *A63F 2300/308* (2013.01)

(58) Field of Classification Search
CPC ..... A63F 13/533; A63F 13/52; A63F 13/2145
See application file for complete search history.

(56) References Cited

U.S. PATENT DOCUMENTS

| | | | | |
|---|---|---|---|---|
| 5,880,731 A | * | 3/1999 | Liles | G06F 3/0481 345/473 |
| 6,009,458 A | * | 12/1999 | Hawkins | A63F 3/00075 709/212 |

(Continued)

FOREIGN PATENT DOCUMENTS

| CN | 104063210 A | 9/2014 |
|---|---|---|
| CN | 108159696 A | 6/2018 |

(Continued)

OTHER PUBLICATIONS

International Search Report dated Jun. 17, 2021 of International Application No. PCT/CN2021/077314.

(Continued)

*Primary Examiner* — Chase E Leichliter
(74) *Attorney, Agent, or Firm* — Qinghong Xu

(57) ABSTRACT

A method for processing a virtual item is provided, including: providing a backpack control by the graphical user interface, wherein the backpack control is configured to display a backpack interface in response to a touch operation; in response to at least one first virtual item satisfying a preset condition in the game scene, displaying a pick-up list displaying item information of the first virtual item; determining a target first virtual item from the at least one first virtual item in response to a first touch operation on the pick-up list; displaying an alternative item list showing item information of a second virtual item, wherein the second virtual item is a virtual item in a backpack of the virtual character; and in response to a second touch operation on the alternative item list, determining a target second virtual (Continued)

- 101 providing a backpack control by the graphical user interface, wherein the backpack control is configured to display a backpack interface in response to a touch operation
- 102 in response to at least one first virtual item satisfying a preset condition in the game scene, displaying a pick-up list, wherein the pick-up list displays item information of the first virtual item
- 103 determining a target first virtual item from the at least one first virtual item in response to a first touch operation on the pick-up list
- 104 displaying an alternative item list, wherein the alternative item list shows item information of a second virtual item, and the second virtual item is a virtual item in a backpack of the virtual character
- 105 in response to a second touch operation on the alternative item list, determining a target second virtual item, and replacing the second virtual item by the target first virtual item item, and replacing the second virtual item by the target first virtual item.

19 Claims, 3 Drawing Sheets

(56) References Cited

U.S. PATENT DOCUMENTS

| | | | | |
|---|---|---|---|---|
| 6,119,229 | A * | 9/2000 | Martinez | A63F 13/12 726/28 |
| 7,275,987 | B2 * | 10/2007 | Shimakawa | A63F 13/30 718/1 |
| 7,425,169 | B2 * | 9/2008 | Ganz | A63H 3/36 446/175 |
| 7,522,912 | B2 * | 4/2009 | Seo | H04W 4/00 455/414.3 |
| 7,780,530 | B2 * | 8/2010 | Ushiro | A63F 13/71 463/1 |
| 8,066,571 | B2 * | 11/2011 | Koster | A63F 13/79 463/43 |
| 8,099,338 | B2 * | 1/2012 | Betzler | G06Q 40/12 705/28 |
| 8,187,067 | B2 * | 5/2012 | Hamilton, II | A63F 13/12 463/9 |
| 9,579,564 | B1 * | 2/2017 | Yu | A63F 13/69 |
| 11,179,637 | B2 * | 11/2021 | Yang | A63F 13/5372 |
| 2002/0151364 | A1 * | 10/2002 | Suchocki | A63F 13/30 463/42 |
| 2003/0008713 | A1 * | 1/2003 | Ushiro | A63F 13/87 463/42 |
| 2004/0075677 | A1 * | 4/2004 | Loyall | G10L 13/033 715/706 |
| 2005/0137015 | A1 * | 6/2005 | Rogers | A63F 13/12 463/42 |
| 2006/0121991 | A1 * | 6/2006 | Borinik | A63F 13/12 463/43 |
| 2006/0143569 | A1 * | 6/2006 | Kinsella | G06Q 10/107 715/752 |
| 2007/0197296 | A1 * | 8/2007 | Lee | A63F 13/12 463/42 |
| 2008/0052242 | A1 * | 2/2008 | Merritt | G06F 21/10 705/51 |
| 2008/0081701 | A1 * | 4/2008 | Shuster | A63F 13/79 463/42 |
| 2008/0120558 | A1 * | 5/2008 | Nathan | A63F 13/352 715/764 |
| 2008/0215973 | A1 * | 9/2008 | Zalewski | A63F 13/77 715/764 |
| 2008/0220876 | A1 * | 9/2008 | Mehta | A63F 13/12 707/E17.014 |
| 2008/0250315 | A1 * | 10/2008 | Eronen | G06F 16/68 715/767 |
| 2008/0280684 | A1 * | 11/2008 | McBride | A63F 13/335 463/42 |
| 2009/0198741 | A1 * | 8/2009 | Cooper | A63F 13/30 |
| 2009/0201299 | A1 * | 8/2009 | Bhogal | A63F 13/30 345/474 |
| 2009/0298568 | A1 | 12/2009 | Pacey et al. | |
| 2009/0312080 | A1 * | 12/2009 | Hamilton | A63F 13/12 463/1 |
| 2010/0005007 | A1 * | 1/2010 | Cox | G06Q 30/06 705/26.1 |
| 2010/0005028 | A1 * | 1/2010 | Hartley | H04L 63/061 705/50 |
| 2010/0035692 | A1 * | 2/2010 | Reville | A63F 13/85 463/43 |
| 2017/0084112 | A1 | 3/2017 | Batsiokis | |
| 2017/0147160 | A1 | 5/2017 | Snyder et al. | |
| 2019/0201789 | A1 * | 7/2019 | Yang | A63F 13/822 |
| 2020/0346113 | A1 * | 11/2020 | Sun | A63F 13/837 |
| 2020/0353355 | A1 * | 11/2020 | Wang | G06F 3/0481 |
| 2020/0360806 | A1 * | 11/2020 | Sun | A63F 13/52 |
| 2020/0393959 | A1 * | 12/2020 | Qiu | G06F 3/04842 |
| 2023/0356079 | A1 * | 11/2023 | Rao | A63F 13/5372 |

FOREIGN PATENT DOCUMENTS

| | | |
|---|---|---|
| CN | 108459811 A | 8/2018 |
| CN | 108579088 A | 9/2018 |
| CN | 108579090 A | 9/2018 |
| CN | 108744510 A | 11/2018 |
| CN | 108815849 A | 11/2018 |
| CN | 109568954 A | 4/2019 |
| CN | 110270098 A | 9/2019 |
| CN | 111151001 A | 5/2020 |
| CN | 111330260 A | 6/2020 |
| CN | 112023392 A | 12/2020 |
| JP | 11156053 A1 | 6/1999 |
| JP | 2018057901 A | 4/2018 |
| JP | 2018187104 A | 11/2018 |

OTHER PUBLICATIONS

1st Office Action dated Nov. 28, 2023 of Chinese Application No. 202010983011.1.
2nd Office Action dated Oct. 31, 2023 of Japanese Application No. 2022-525451.
Persona Q Shadow of the Labyrinth, Official Guide—Dugeon Break an Eve, Zenyasai et al., first edition, Japan, Kadokawa Corporation, Jun. 17, 2014, p. 46.
1st Office Action dated Mar. 26, 2025 of Chinese Application No. 2024107988595.

* cited by examiner

VIRTUAL ITEM PROCESSING METHOD AND DEVICE

The present disclosure is a 35 U.S.C. 371 national phase application of PCT International Application No. PCT/CN2021/077314 filed on Feb. 22, 2021, which claims the priority of the Chinese patent application with application number of 202010983011.1 and titled with "Method and Device for Processing Virtual Item" filed on Sep. 17, 2020, the entire contents of both are incorporated herein by reference in their entireties.

TECHNICAL FIELD

The present disclosure relates to the technical field of games, in particular to a method for processing a virtual item and a device for processing a virtual item.

BACKGROUND

At present, many competitive or sandbox games have a backpack system, which is used to store the props obtained by the players during the game. Players may pick up various props during the battle, so as to realize different game strategies. However, the backpack system often has a pick-up limit, and players will face the problem of not being able to pick up items when the backpack slot is full.

It should be noted that the information disclosed in the above background section is only for enhancing the understanding of the background of the present disclosure, and therefore may include information that does not constitute the prior art known to those of ordinary skill in the art.

SUMMARY

An embodiment of the present disclosure provides a method for processing a virtual item. A graphical user interface is provided by a display interface of a terminal device. The graphical user interface displays at least part of a game scene, and the game scene contains a virtual character.

The methods include steps of: providing a backpack control by the graphical user interface, where the backpack control is configured to display a backpack interface in response to a touch operation; in response to at least one first virtual item satisfying a preset condition in the game scene, displaying a pick-up list, where the pick-up list displays item information of the first virtual item; determining a target first virtual item from the at least one first virtual item in response to a first touch operation on the pick-up list; displaying an alternative item list, where the alternative item list shows item information of a second virtual item, and the second virtual item is a virtual item in a backpack of the virtual character; and in response to a second touch operation on the alternative item list, determining a target second virtual item, and replacing the second virtual item by the target first virtual item.

Another embodiment of the present disclosure provides a device for processing a virtual item. A graphical user interface is provided by a display interface of a terminal device. The graphical user interface displays at least part of a game scene, and the game scene includes a virtual character. The device includes: a backpack control module, configured to provide a backpack control by the graphical user interface, where the backpack control is configured to display a backpack interface in response to a touch operation; a pick-up list module, configured to display a pick-up list in response to at least one first virtual item satisfying a preset condition in the game scene, where the pick-up list displays item information of the first virtual item; a target determination module, configured to determine a target first virtual item from the at least one first virtual item in response to a first touch operation on the pick-up list; an alternative item list module, configured to display an alternative item list, where the alternative item list shows item information of a second virtual item, and the second virtual item is a virtual item in a backpack of the virtual character; and a virtual item replacement module, configured to determine a target second virtual item in response to a second touch operation on the alternative item list, and replace the second virtual item by the target first virtual item.

Another embodiment of the present disclosure provides an electronic device, including a processor, a memory, and a computer program stored on the memory and capable of running on the processor. When executed by the processor, the computer program implements steps in the method for processing a virtual item as described above.

Another embodiment of the present disclosure provides a computer-readable storage medium, where a computer program is stored on the computer-readable storage medium. When executed by a processor, the computer program implements steps in the method for processing a virtual item as described above.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the specification, illustrate embodiments consistent with the present disclosure and together with the description serve to explain the principle of the present disclosure. Apparently, the drawings in the following description are only some embodiments of the present disclosure, and those skilled in the art may obtain other drawings according to these drawings without creative efforts.

DETAILED DESCRIPTION OF THE EMBODIMENTS

Figure 1:
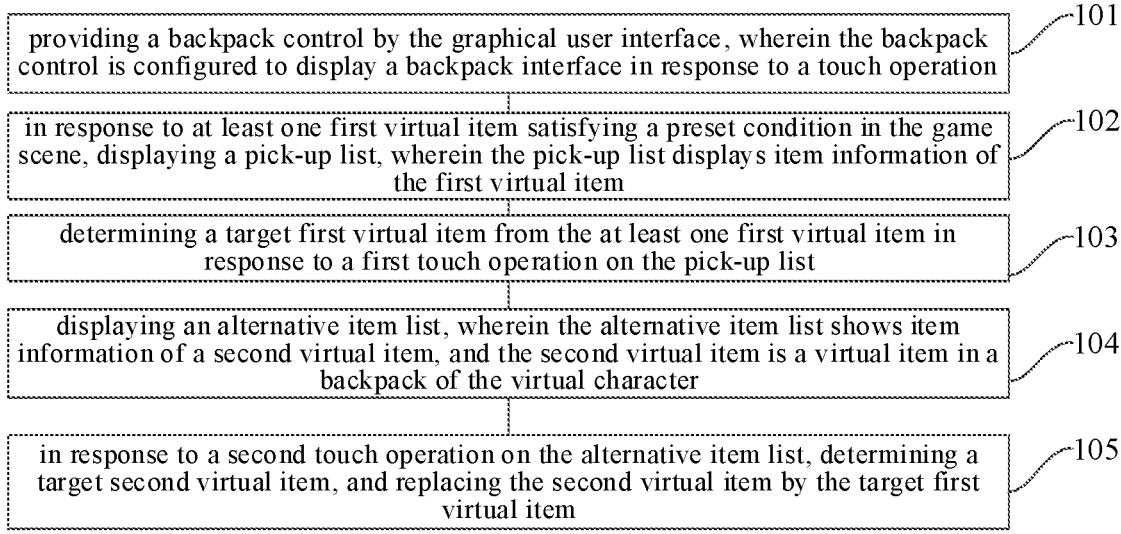
FIG. 1 is a flow chart of steps in a method for processing a virtual item according to an embodiment of the present disclosure.

Example embodiments will now be described more fully with reference to the accompanying drawings. Example embodiments may, however, be embodied in many forms and should not be construed as limited to embodiments set forth herein. Rather, these embodiments are provided so that the present disclosure will be thorough and complete, and will fully convey the concept of example embodiments to those skilled in the art. The same reference numerals in the drawings denote the same or similar structures, and thus their detailed descriptions will be omitted. Furthermore, the drawings are merely schematic illustrations of the present disclosure and are not necessarily drawn to scale.

The method for processing a virtual item described in embodiments of the present disclosure may run on a terminal device or a server. The terminal device may be a local terminal device. When the method for processing a virtual item runs on a server, it may be a cloud game.

In some embodiments, the cloud game refers to a game mode based on cloud computing. In the running mode of a cloud game, the running subject of the game program and the presenting subject of the game screen are separate, storage and operation of the virtual item processing method are completed on the cloud game server, and the cloud game client is used to receive and transmit data and to present the game screen. For example, the cloud game client may be a display device with data transmission function close to the user side, such as mobile terminal, TV, computer, handheld computer, etc. But the terminal device for information display is a cloud game server in the cloud. When playing the game, the player operates the cloud game client to send an operation command to the cloud game server, and the cloud game server runs the game according to the operation command, encodes and compresses data such as the game screen, and returns it to the cloud game client through the network. In the end, the game screen is decoded and output by the cloud game client.

In some embodiments, the terminal device may be a local terminal device. The local terminal device stores the game program and is used to present the game screen. The local terminal device is used to interact with the player through the graphical user interface. That is, the game program is downloaded, installed, and run by the electronic device. The local terminal device may provide the graphical user interface to the player in various manners. For example, the graphical user interface may be rendered and displayed on the display screen of the terminal, or provided to the player by holographic projection. For example, the local terminal device may include a display screen and a processor. The display screen is used to present the graphical user interface, and the graphical user interface includes the game screen. The processor is used to run the game, generate the graphical user interface, and control the graphical user interface displayed on the display screen.

In the related art, when the backpack is full, the player needs to open the backpack, select an item and discard it, and then close the backpack, so as to leave room for a new item. The item discarding operation is cumbersome, and the operation efficiency of picking up an item and replacing an item in the backpack is low, which is difficult to access the function provided by terminal device.

Referring to FIG. 1, it shows a flow chart of steps in a method for processing a virtual item according to an embodiment of the present disclosure. An embodiment of the present disclosure proposes a method for processing a virtual item. A graphical user interface is provided by the display interface of the terminal device. The graphical user interface displays at least part of a game scene, and the game scene contains a virtual character.

It should be noted that the display interface in embodiments of the present disclosure may refer to the interface displayed by the display component (for example, touch screen, display) of the first terminal device, and the graphical user interface may refer to the interface rendered by the application program (for example, game program interface).

Embodiments of the present disclosure may specifically include the following steps.

In step 101, a backpack control is provided by the graphical user interface. The backpack control is configured to display a backpack interface in response to a touch operation.

The backpack control is provided in the graphical user interface. When the user performs a touch operation on the backpack control, the backpack control displays a backpack interface in response to the touch operation. The backpack interface displays all virtual items owned by the virtual character.

In step 102, in response to at least one first virtual item satisfying a preset condition in the game scene, a pick-up list is displayed. The pick-up list displays item information of the first virtual item.

The preset condition may be a position condition. For example, when the player operates the virtual character to move in the game scene, and at least one first virtual item appears within a certain distance range of the virtual character, the terminal will display, on a right side of the graphical user interface, a pick-up list in a blank space without any function button, which pick-up list does not affect the player in viewing contents of the graphical user interface. The item information of the first virtual item displayed in the pick-up list includes but is not limited to icon, name, quantity, and effect.

Figure 2:
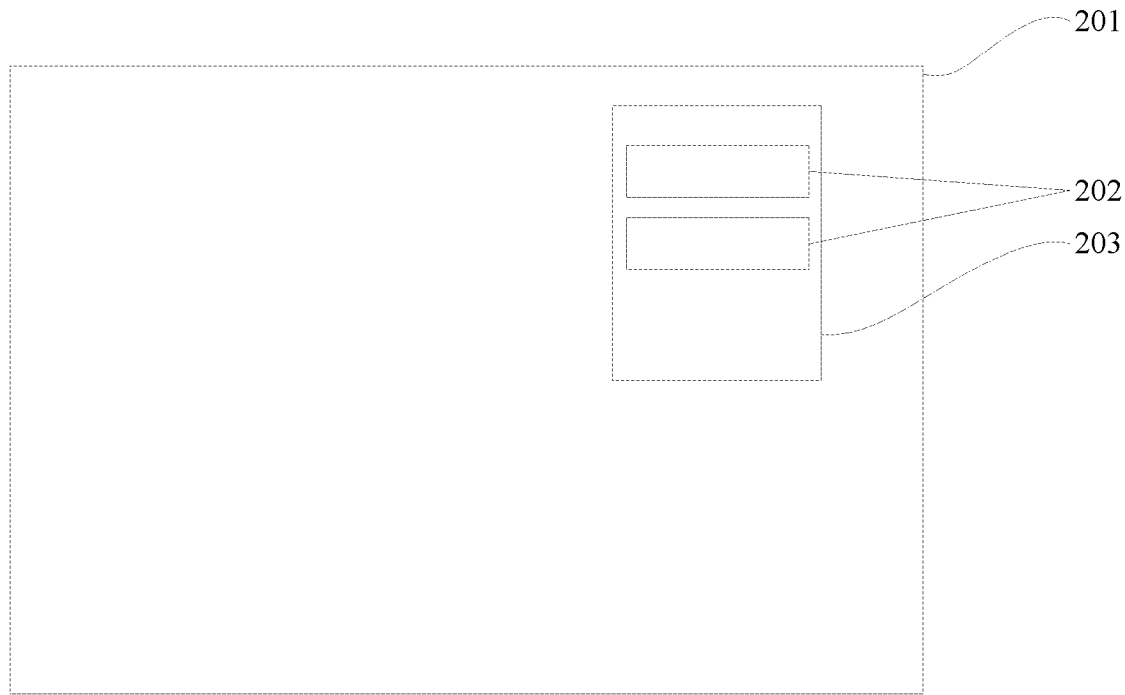
FIG. 2 is a schematic diagram of a pick-up list in a method for processing a virtual item according to an embodiment of the present disclosure.

As an example, as shown in FIG. 2, when there is at least one first virtual item 202 satisfying the preset condition in the game scene displayed by the graphical user interface 201, a pick-up list 203 that does not affect the player's field of view is displayed on the graphical user interface 201.

In some embodiments of the present disclosure, a plurality of first virtual items are provided, and the method further includes the following steps.

In step S11, ranking information and item information of the plurality of first virtual items are determined.

In step S12, the ranking information, the item information, and a preset display quantity are used to generate a pick-up list.

When there are a plurality of first virtual items satisfying the preset condition, the ranking information of the first virtual items is determined according to a preset ranking method. The preset ranking method includes but is not limited to ranking by first letter of name, ranking by type, ranking by rarity. The item information of the first virtual items is determined at the same time.

After determining the ranking information and the item information of the first virtual items, the first virtual items are ranked into set according to the ranking information. Then, according to the preset display number N, the first N ones of the first virtual items in the ranking set are selected, and in combination with the item information corresponding to the first N ones of the first virtual items, a pickup list is generated for display. N is a positive integer.

In step 103, a target first virtual item is determined from the at least one first virtual item in response to a first touch operation on the pick-up list.

For example, when the player clicks to pick up a first virtual item among the at least one first virtual item in the pick-up list, and starts to drag it, it is determined that the selected first virtual item is the target first virtual item.

In step 104, an alternative item list is displayed. The alternative item list displays item information of a second virtual item. The second virtual item is a virtual item in the backpack of the virtual character.

In a specific implementation, not all the virtual items in the backpack of the virtual character can be replaced. For this reason, the alternative item list is displayed, showing the item information of the second virtual item that may be replaced in the backpack, so that at least part of the virtual item in the backpack is displayed when the user does not open the backpack interface. The alternative item list may be permanently displayed in the graphical user interface, or may be displayed in the graphical user interface while determining the target first virtual item, which is not limited in the present disclosure.

Figure 3:
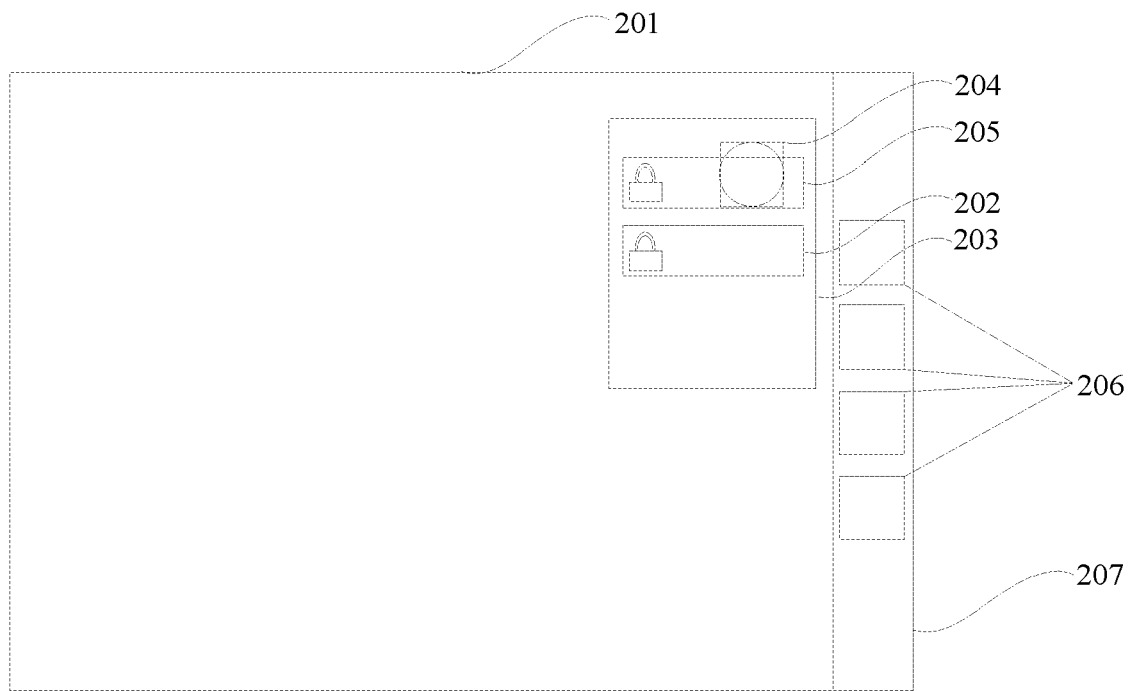
FIG. 3 is a schematic diagram of a pick-up list where the first virtual item cannot be picked up in a method for processing a virtual item according to an embodiment of the present disclosure.

For example, as shown in FIG. 3, when the player 204 determines to select at least one first virtual item 202 in the pick-up list 203 as the target first virtual item 205, an alternative list 207 is displayed at the same time. Item information of the second virtual item 206 is displayed in the alternative list.

In some embodiments, the display area for the alternative item list is different from the area where the backpack interface is located.

In some embodiments, before displaying the alternative item list, the method further includes the following steps.

In step S21, it is determined whether the current backpack space corresponding to the backpack of the virtual character reaches the space threshold.

In a specific implementation, every time the virtual character picks up, discards, or uses a virtual item, the server will synchronize the data about the available space of the virtual character's backpack to the client, so that the client will determine whether the current backpack space corresponding to the virtual character's backpack reaches the space threshold according to the data fed back by the server. The space threshold may be set by those skilled in the art according to actual conditions, which is not limited in the present disclosure.

In step S22, when the current backpack space does not reach the space threshold, the target first virtual object is controlled to be placed in the backpack.

When the current backpack space does not reach the space threshold, the target first virtual object is controlled to be placed in the backpack, the target first virtual object in the pick-up list is removed, and other unselected first virtual objects are moved up sequentially. The virtual character's backpack is added with a target first virtual object, which occupies the available space of the backpack. At the same time, the pick-up result is synchronized to the server.

In step S23, when the current backpack space has reached the space threshold, the step of displaying the alternative item list is performed.

When the current backpack space has reached the space threshold, the virtual character cannot directly pick up the target first virtual item, and the icon of the first virtual item in the pick-up list shows a full sign. In this case, the alternative item list is displayed.

Figure 4:
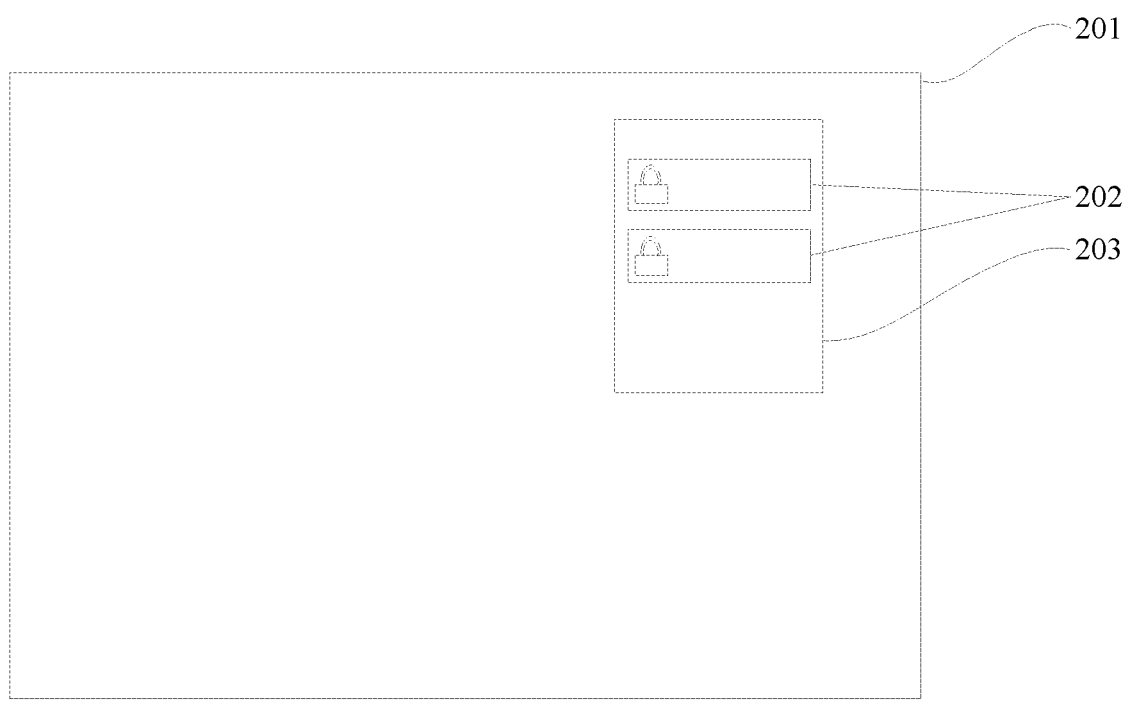
FIG. 4 is a schematic diagram of an alternative item list in a method for processing a virtual item according to an embodiment of the present disclosure.

For example, as shown in FIG. 4, a full sign appears on the icon of at least one first virtual item 202 in the pick-up list 203. In step 105, in response to the second touch operation on the alternative item list, a target second virtual item is determined, and the second virtual item is replaced by the target first virtual item.

In a specific implementation, the player may drag the target first virtual item onto any second virtual item. When dragging onto one of the second virtual items in the alternative item list, and then the player stops or lets it go, it is determined that the second virtual item is the target second virtual item, and the target first virtual item is replaced by the target second virtual item.

In some embodiments, the second touch operation includes a first sub-operation and a second sub-operation. The operation of determining the target second virtual item in response to the second touch operation on the alternative item list includes the following steps.

Step S31, in response to the first sub-operation, a pending second virtual item corresponding to the first sub-operation is determined.

In a specific implementation, if the player drags the target first virtual item to rest on the second virtual item, it is determined that the second virtual item is the pending second virtual item.

In some embodiments, the method includes: generating a feature comparison interface corresponding to the pending second virtual item in response to the first sub-operation.

The feature comparison interface corresponding to the pending second virtual item and the target first virtual item is generated and displayed on the graphical user interface.

Figure 5:
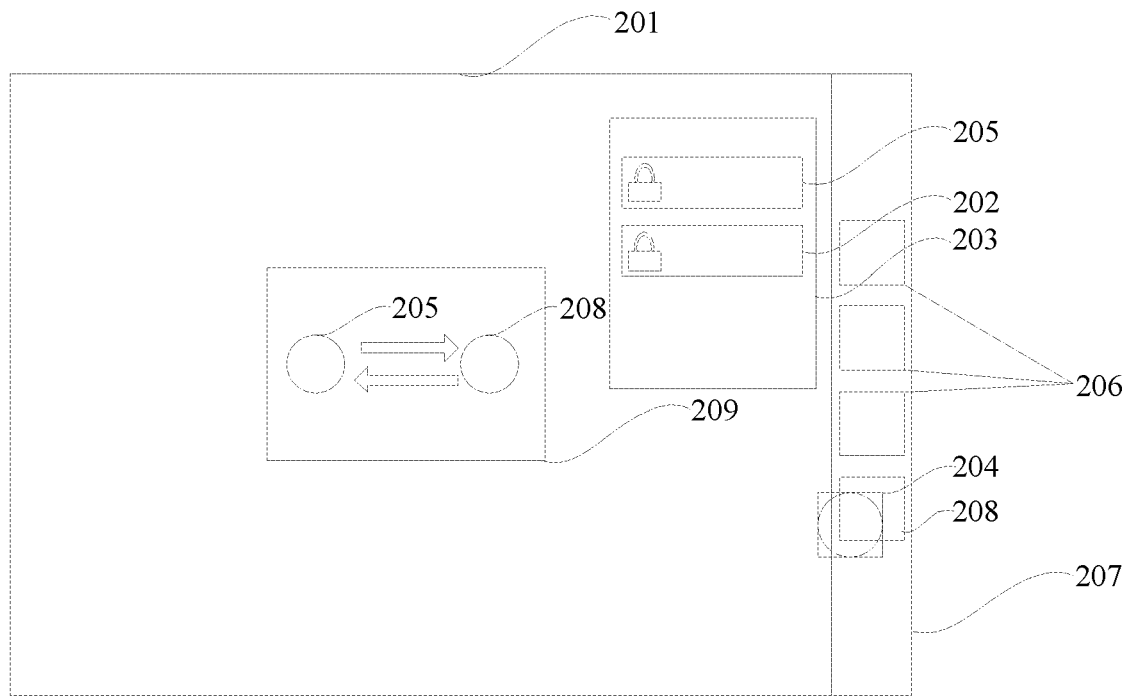
FIG. 5 is a schematic diagram of a feature comparison interface in a method for processing a virtual item according to an embodiment of the present disclosure.

For example, as shown in FIG. 5, the feature comparison interface 209 corresponding to the pending second virtual item 208 and the target first virtual item 205 is generated and displayed on the graphical user interface 201.

In some embodiments, the operation of generating the feature comparison interface corresponding to the pending second virtual item includes the following steps.

In step S311, feature information corresponding to the target first virtual item and the pending second virtual item is determined.

In step S312, the specified display rule and the feature information are used to generate the feature comparison interface.

The feature information includes icon information, attribute information, and quantity information.

In a specific implementation, when determining the target first virtual item and the pending second virtual item, icon information, attribute information, and quantity information of the two are obtained, and the respective feature information is compared one by one according to the specified display rule, so as to generate the feature comparison interface. The display rule may be using color to distinguish different parts in the feature information.

In step S32, in response to the second sub-operation, the pending virtual item corresponding to the second sub-operation is determined as the target second virtual item.

In a specific implementation, when the player drags the target first virtual item and lets it go on the pending virtual item, it is determined that the pending virtual item is the target second virtual item.

In an embodiment of the present disclosure, a graphical user interface is provided by a display interface of a terminal device, the graphical user interface displays at least part of a game scene, and the game scene includes a virtual characters. The method includes: providing a backpack control by the graphical user interface, where the backpack control is configured to display a backpack interface in response to a touch operation; in response to at least one first virtual item satisfying a preset condition in the game scene, displaying a pick-up list, where the pick-up list displays item information of the first virtual item; in response to the first touch operation on the pick-up list, determining the target first virtual item from the at least one first virtual item; displaying an alternative item list, where the alternative item list displays item information of a second virtual item, and the second virtual item is a virtual item in the virtual character's backpack; and in response to a second touch operation on the alternative item list, determining a target second virtual item, and replacing the second virtual item by the target first virtual item. This allows the player to quickly pick up a virtual item, even when the capacity of the virtual character's backpack is at the upper limit. Further, the second virtual item in the virtual character's backpack is directly replaced by the first virtual item, and this operation is simple and fast. In this way, the operation efficiency of virtual item processing is improved. Furthermore, according to the approach provided by the present disclosure, changes about GUI also help to improve the computer performances. To be specific, the access way for data may be changed, which helps to improve the access speed for functions of the terminal device.

It should be noted that, with respect to the method embodiment, for the sake of simple description, it is expressed as a series of operation combinations. Those skilled in the art shall know that embodiments of the present disclosure are not limited by the described operation order, and according to embodiments of the present disclosure, certain steps may be performed in other orders or simultaneously. Furthermore, those skilled in the art shall also know that the embodiments described in the specification are all optional embodiments, and the operations involved herein are not necessarily essential for the embodiments of the present disclosure.

Figure 6:
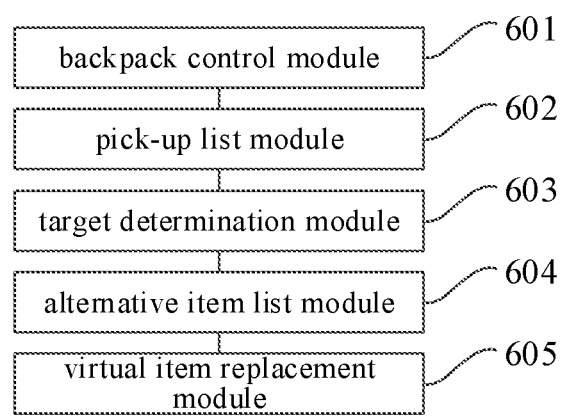
FIG. 6 is a structural block diagram of a device for processing a virtual item according to an embodiment of the present disclosure.

Referring to FIG. 6, it shows a structural block diagram of a device for processing a virtual item according to an embodiment of the present disclosure. A graphical user interface is provided by a display interface of a terminal device, and the graphical user interface displays at least part of a game scene. The game scene contains a virtual character. The device specifically includes the following modules.

The backpack control module 601 is configured to provide a backpack control by the graphical user interface. The backpack control is configured to display a backpack interface in response to a touch operation.

The pick-up list module 602 is configured to display a pick-up list when there is at least one first virtual item satisfying a preset condition in the game scene. The pick-up list displays item information of the first virtual item.

The target determination module 603 is configured to determine a target first virtual item from the at least one first virtual item in response to a first touch operation on the pick-up list.

The alternative item list module 604 is configured to display an alternative item list. The alternative item list shows item information of a second virtual item, and the second virtual item is a virtual item in the virtual character's backpack.

The virtual item replacement module 605 is configured to determine a target second virtual item in response to a second touch operation on the alternative item list, and replace the second virtual item by the target first virtual item.

In some embodiments of the present disclosure, the device further includes: a determination module, configured to determine whether the current backpack space corresponding to the backpack of the virtual character reaches a space threshold; a pick-up module, configured to control and place the target first virtual object in the backpack when the current backpack space does not reach the space threshold; and an alternative item list display module, configured to perform the step of displaying the alternative item list when the current backpack space has reached the space threshold.

In some embodiments of the present disclosure, the device further includes: an area module, configured to render the display area for the alternative item list to be different from the area where the backpack interface is located.

In some embodiments of the present disclosure, the second touch operation includes a first sub-operation and a second sub-operation. The virtual item replacement module 605 includes: a first sub-operation module, configured to determine a pending second virtual item corresponding to the first sub-operation in response to the first sub-operation; and a second operation sub-module, configured to determine that the pending virtual item corresponding to the second sub-operation is the target second virtual item in response to the second sub-operation.

In some embodiments of the present disclosure, the device further includes: a feature comparison interface module, configured to generate a feature comparison interface corresponding to the pending second virtual item in response to the first sub-operation.

In some embodiments of the present disclosure, the feature comparison interface module includes: a feature information determination sub-module, configured to determine feature information corresponding to the target first virtual item and the pending second virtual item; and a feature comparison interface generation sub-module, configured to generate the feature comparison interface by using a specified display rule and the feature information.

The feature information includes icon information, attribute information, and quantity information.

In some embodiments of the present disclosure, a plurality of first virtual items are provided, and the device further includes: a first virtual item module, configured to determine ranking information and item information of the plurality of first virtual items; and a pick-up list generation module, configured to generate a pick-up list by using the ranking information, the item information, and a preset display quantity.

With respect to the device embodiment, since it is basically similar to the method embodiment, the description is relatively simple, and for related parts, please refer to the part of description about the method embodiment.

Each embodiment in the specification is described in a progressive manner, each embodiment focuses on its difference from other embodiments, and the same and similar parts about each embodiment may be referred to each other.

An embodiment of the present disclosure also provides an electronic device, including a processor, a memory, and a computer program stored on the memory and capable of running on the processor. When the computer program is executed by the processor, steps in the method for processing a virtual item as described above are implemented.

An embodiment of the present disclosure also provides a computer-readable storage medium, where a computer program is stored on the computer-readable storage medium. When the computer program is executed by a processor, steps in the method for processing a virtual item as described above are implemented.

Those skilled in the art should understand that embodiments of the present disclosure may be provided as methods, devices, or computer program products. Accordingly, embodiments of the present disclosure may take the form of an entirely hardware embodiment, an entirely software embodiment, or an embodiment combining software and hardware aspects. Furthermore, embodiments of the present disclosure may take the form of a computer program product embodied on one or more computer-usable storage media (including but not limited to disk storage, CD-ROM, optical storage, etc.) having computer-usable program code embodied therein.

Embodiments of the present disclosure are described with reference to flowcharts and/or block diagrams of methods, terminal devices (systems), and computer program products according to embodiments of the present disclosure. It should be understood that each procedure and/or block in the flowchart and/or the block diagram, and combinations of procedures and/or blocks in the flowchart and/or the block diagram may be realized by computer program instructions. These computer program instructions may be provided to a general purpose computer, special purpose computer, embedded processor or processor of other programmable data processing terminal device to produce a machine, so that instructions executed by the computer or processor of other programmable data processing terminal device produce means for realizing the functions specified in one or more procedures of the flowchart and/or one or more blocks of the block diagram.

These computer program instructions may also be stored in a computer-readable memory capable of directing a computer or other programmable data processing terminal device to operate in a specific manner, so that the instructions stored in the computer-readable memory produce an article of manufacture comprising instruction means. The instruction means implements the functions specified in one or more procedures of the flowchart and/or one or more blocks of the block diagram.

These computer program instructions may also be loaded into a computer or other programmable data processing terminal device, so that a series of operational steps are performed on the computer or other programmable terminal device to produce computer-implemented processing. Thereby, the instructions executed above on the computer or other programmable data processing terminal device provide steps for implementing the functions specified in one or more procedures of the flowchart and/or one or more blocks of the block diagram.

While alternatives to the embodiments of the present disclosure have been described, additional changes and modifications to these embodiments will occur to those skilled in the art once the basic inventive concept is appreciated. Therefore, it is intended that the appended claims be construed to cover alternative embodiments and all the changes and modifications that fall within the scope of the disclosed embodiments.

Finally, it should also be noted that in the present disclosure, relational terms such as first and second etc. are only used to distinguish one entity or operation from another, and do not necessarily require or imply that any such actual relationship or order exists among these entities or operations. Furthermore, the term "comprise", "include" or any other variation thereof is intended to cover a non-exclusive inclusion, so that a process, method, article, or terminal device comprising a set of elements includes not only those elements, but also includes elements not expressly listed, or also include elements inherent in such a process, method, article, or terminal device. Without further limitations, an element defined by the phrase "comprise one" does not exclude the presence of additional identical elements in the process, method, article or terminal device comprising said element.

The above is a detailed introduction of a virtual item processing method and a virtual item processing device provided by the present disclosure. In the present disclosure, specific examples are used to illustrate the principle and implementation methods of the present disclosure. The description of the above embodiments is only used to help understand the method of the present disclosure and its core idea. At the same time, for those of ordinary skill in the art, according to the idea of the present disclosure, there will be changes in the specific implementation and application scope. In summary, the content of this specification should not be construed as limiting the present disclosure.

The invention claimed is:

1. A method for processing a virtual item, wherein:
a graphical user interface is provided by a display interface of a terminal device, the graphical user interface displays at least part of a game scene, and the game scene contains a virtual character, and
the method comprises:
providing a backpack control by the graphical user interface, wherein the backpack control is configured to display a backpack interface in response to a touch operation;
in response to at least one first virtual item satisfying a preset condition in the game scene, displaying a pick-up list, wherein the pick-up list displays item information of the first virtual item;
determining a target first virtual item from the at least one first virtual item in response to a first touch operation on the pick-up list;
displaying an alternative item list, wherein the alternative item list shows item information of a second virtual item, and the second virtual item is a virtual item in a backpack of the virtual character; and
in response to a second touch operation on the alternative item list, determining a target second virtual item, and replacing the second virtual item by the target first virtual item.

2. The method according to claim 1, wherein, before displaying the alternative item list, the method further comprises:
determining whether a current backpack space corresponding to the backpack of the virtual character reaches a space threshold;
in response to the current backpack space not reaching the space threshold, controlling and placing the target first virtual object in the backpack; and
in response to the current backpack space reaching the space threshold, displaying the alternative item list.

3. The method according to claim 2, wherein
a plurality of first virtual items are provided, and
the method further comprises:
determining ranking information and item information for the plurality of first virtual items; and
generating a pick-up list by using the ranking information, the item information, and a preset display quantity.

4. The method according to claim 1, wherein a display area for the alternative item list is different from an area where the backpack interface is located.

5. The method according to claim 4, wherein
a plurality of first virtual items are provided, and
the method further comprises:
determining ranking information and item information for the plurality of first virtual items; and
generating a pick-up list by using the ranking information, the item information, and a preset display quantity.

6. The method according to claim 1, wherein
the second touch operation comprises a first sub-operation and a second sub-operation; and the step of determining the target second virtual item in response to the second touch operation on the alternative item list comprises:
- in response to the first sub-operation, determining a pending second virtual item corresponding to the first sub-operation; and
- in response to the second sub-operation, determining a pending virtual item corresponding to the second sub-operation as the target second virtual item.

7. The method according to claim 6, wherein the method further comprises:
- in response to the first sub-operation, generating a feature comparison interface corresponding to the pending second virtual item.

8. The method according to claim 7, wherein the step of generating the feature comparison interface corresponding to the pending second virtual item comprises:
- determining feature information corresponding to the target first virtual item and the pending second virtual item; and
- generating the feature comparison interface by using a specified display rule and the feature information,
- wherein the feature information comprises icon information, attribute information, and quantity information.

9. The method according to claim 8, wherein
- a plurality of first virtual items are provided, and
- the method further comprises:
- determining ranking information and item information for the plurality of first virtual items; and
- generating a pick-up list by using the ranking information, the item information, and a preset display quantity.

10. The method according to claim 7, wherein
- a plurality of first virtual items are provided, and
- the method further comprises:
- determining ranking information and item information for the plurality of first virtual items; and
- generating a pick-up list by using the ranking information, the item information, and a preset display quantity.

11. The method according to claim 6, wherein
- a plurality of first virtual items are provided, and
- the method further comprises:
- determining ranking information and item information for the plurality of first virtual items; and
- generating a pick-up list by using the ranking information, the item information, and a preset display quantity.

12. The method according to claim 1, wherein
- a plurality of first virtual items are provided, and
- the method further comprises:
- determining ranking information and item information for the plurality of first virtual items; and
- generating a pick-up list by using the ranking information, the item information, and a preset display quantity.

13. An electronic device, comprising a processor, a memory, and a computer program stored on the memory and capable of running on the processor, wherein when executed by the processor, the computer program implements steps in a method for processing a virtual item, wherein:
- a graphical user interface is provided by a display interface of a terminal device, the graphical user interface displays at least part of a game scene, and the game scene contains a virtual character, and
- the method comprises:
- providing a backpack control by the graphical user interface, wherein the backpack control is configured to display a backpack interface in response to a touch operation;
- in response to at least one first virtual item satisfying a preset condition in the game scene, displaying a pick-up list, wherein the pick-up list displays item information of the first virtual item;
- determining a target first virtual item from the at least one first virtual item in response to a first touch operation on the pick-up list;
- displaying an alternative item list, wherein the alternative item list shows item information of a second virtual item, and the second virtual item is a virtual item in a backpack of the virtual character; and
- in response to a second touch operation on the alternative item list, determining a target second virtual item, and replacing the second virtual item by the target first virtual item.

14. The electronic device according to claim 13, wherein, before displaying the alternative item list, the method further comprises:
- determining whether a current backpack space corresponding to the backpack of the virtual character reaches a space threshold;
- in response to the current backpack space not reaching the space threshold, controlling and placing the target first virtual object in the backpack; and
- in response to the current backpack space reaching the space threshold, displaying the alternative item list.

15. The electronic device according to claim 13, wherein a display area for the alternative item list is different from an area where the backpack interface is located.

16. The electronic device according to claim 13, wherein
- the second touch operation comprises a first sub-operation and a second sub-operation; and
- the step of determining the target second virtual item in response to the second touch operation on the alternative item list comprises:
- in response to the first sub-operation, determining a pending second virtual item corresponding to the first sub-operation; and
- in response to the second sub-operation, determining a pending virtual item corresponding to the second sub-operation as the target second virtual item.

17. The electronic device according to claim 16, wherein the method further comprises:
- in response to the first sub-operation, generating a feature comparison interface corresponding to the pending second virtual item.

18. The electronic device according to claim 17, wherein the step of generating the feature comparison interface corresponding to the pending second virtual item comprises:
- determining feature information corresponding to the target first virtual item and the pending second virtual item; and
- generating the feature comparison interface by using a specified display rule and the feature information,
- wherein the feature information comprises icon information, attribute information, and quantity information.

19. The electronic device according to claim 13, wherein
- a plurality of first virtual items are provided, and
- the method further comprises:
- determining ranking information and item information for the plurality of first virtual items; and
- generating a pick-up list by using the ranking information, the item information, and a preset display quantity.

* * * * *